June 6, 1939.                R. E. WHELESS                2,161,734
                       VEHICLE LOADING APPARATUS
                 Original Filed March 4, 1937    3 Sheets-Sheet 1

Inventor
Roger E. Wheless,
By Church & Church
His Attorneys

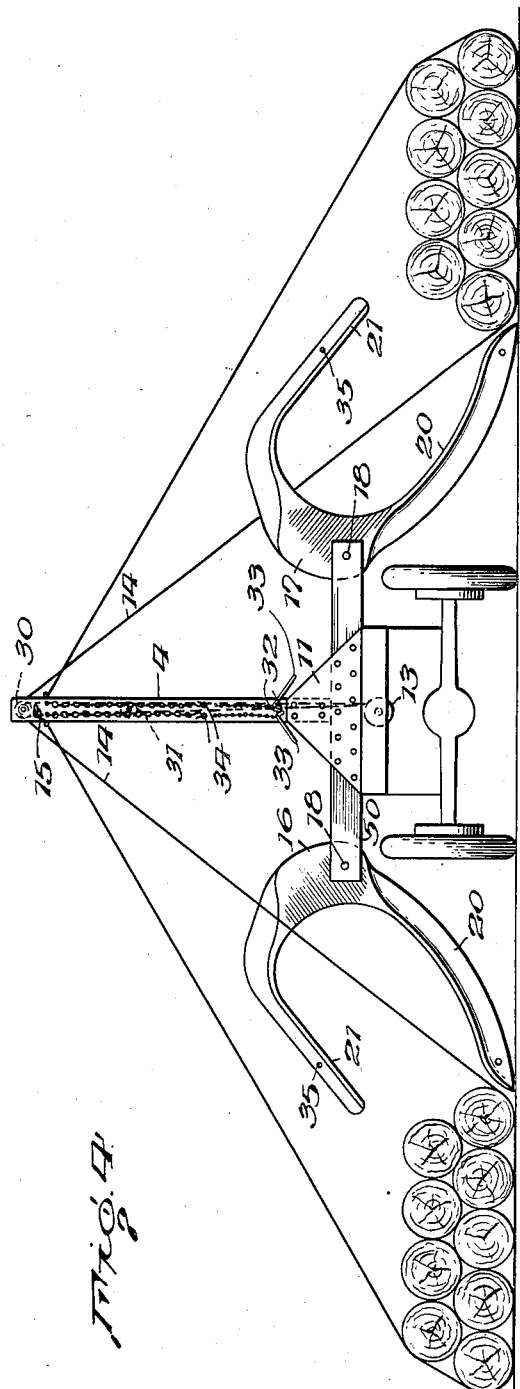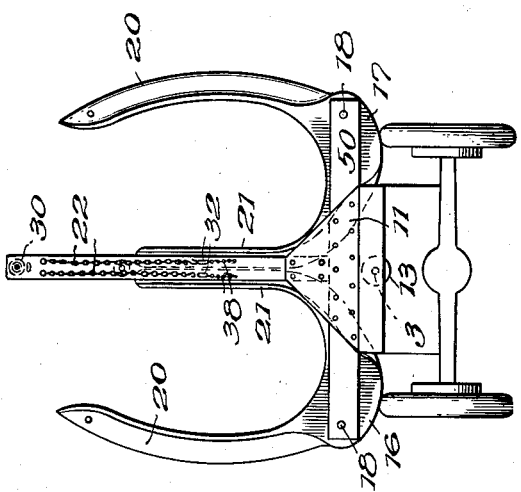

June 6, 1939.  R. E. WHELESS  2,161,734
VEHICLE LOADING APPARATUS
Original Filed March 4, 1937  3 Sheets-Sheet 3

Inventor
Roger E. Wheless,
By Church & Church
His Attorneys

Patented June 6, 1939

2,161,734

UNITED STATES PATENT OFFICE 2,161,734

VEHICLE LOADING APPARATUS

Roger E. Wheless, Shreveport, La.

Application March 4, 1937, Serial No. 129,012
Renewed April 10, 1939

8 Claims. (Cl. 214—65.3)

This invention relates to a loading apparatus especially designed for facilitating the loading of elongated elements of material, such as logs, pipes and the like onto the body of a vehicle.

One object of the invention is to provide a loading apparatus of simple but sturdy construction, capable of withstanding the strains imposed upon it by the heavy materials handled with it.

Another object of the invention is to provide a loading apparatus wherein a multiplicity of logs, or the like, can be loaded onto the vehicle at a single operation or as a group.

Another object is to provide a loading apparatus whereby the equilibrium of the vehicle will be maintained during the loading operation. Specifically, this object contemplates simultaneously loading groups of logs of substantially equal weight at opposite sides of the vehicle.

A still further object of the invention is to provide a loading apparatus in which all the logs will be safely retained on the body of the vehicle, accidental displacement of the same being practically impossible.

With these and other objects in view, the invention consists in certain details of construction and combinations and arrangements of parts, all as will hereinafter be more fully described, and the novel features thereof particularly pointed out in the appended claims.

In the accompanying drawings—

Fig. 3 is an elevational view taken from the rear of the vehicle;

Fig. 4 is a rear elevational view illustrating the first step in the loading of the logs on the vehicle;

Figure 1:
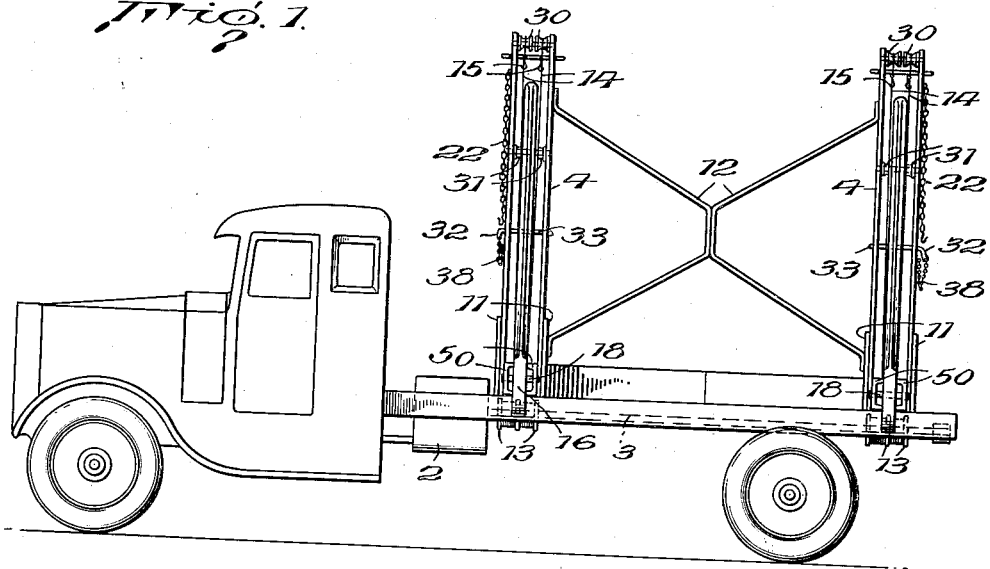
Figure 1 is a side elevational view of a vehicle equipped with the preferred form of loading apparatus contemplated by the present invention, the vehicle proper being shown more or less in outline.
Figure 2:
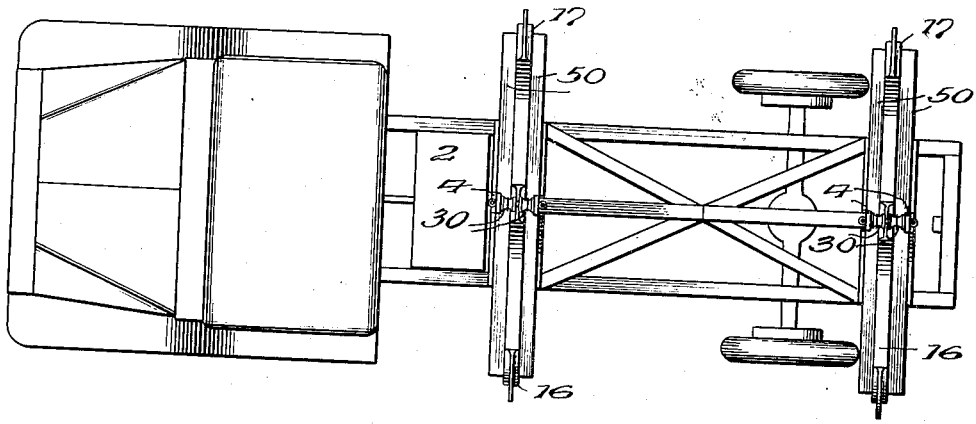
Figure 2 is a top plan view of the same.

A winch 2 supported on the frame or chassis of the vehicle is adapted to be operated by the power unit of the vehicle. The winch 2 is adapted to drive a shaft 3 extending therefrom toward the rear of the chassis and mounted on said shaft are a plurality of drums 13 carrying cables 14. Mounted fore and aft of the chassis are standards 4 braced lengthwise of the vehicle by the longitudinal bracing members 12, and laterally or transversely by base members or gusset plates 11. Journaled in each upright are rollers or pulleys 30 and the cables from drums 13 extend up over said pulleys 30 from whence they are adapted to be formed into a loop, as will be more fully described hereinafter, and their free ends, carrying hooks 15, attached to a fixed portion of the vehicle. It will be appreciated, of course, that other means of bracing the columns or standards 4, so that they will carry the required load, may be used in lieu of those shown, it only being necessary that the bracing means not interfere with the proper movements of the operating parts of the apparatus.

Figure 5:
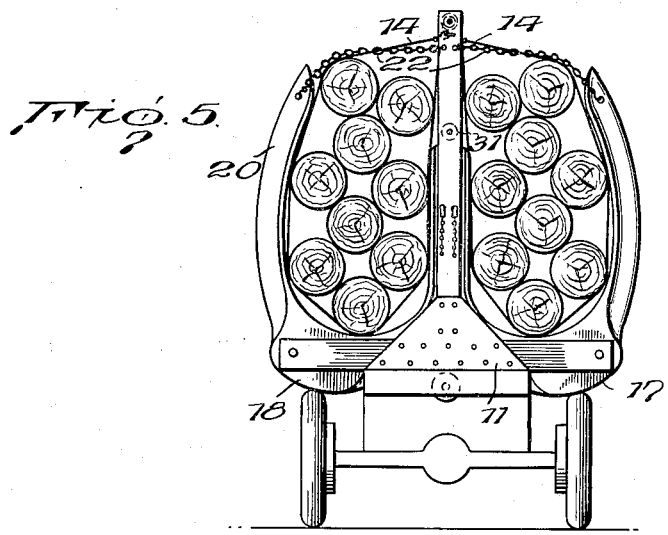
Fig. 5 is a similar view showing the loading completed.

Mounted transversely of the chassis are cross members 50, said cross members being arranged in pairs fore and aft the vehicle adjacent standards 4, with the members of each pair spaced apart somewhat longitudinally of the vehicle. Mounted between the members 50 of each pair, and at each end of each pair, is a cradle or what might be described as a bifurcated member having bifurcations or arms 20, 21. The pair of cradles at one side of the vehicle are indicated at 16, and the pair at the opposite side, at 17. These cradles or bifurcated members are pivoted at 18 between the cross members 50, so as to be capable of swinging outwardly or downwardly in a vertical plane relatively to the chassis of the vehicle. The arm 20 of each bifurcated member, which is the lowermost arm when the cradles or members 16, 17 are lowered to their loading position, is preferably curved somewhat and is adapted to rest upon the ground or other surface underlying or supporting the logs or other elements to be loaded onto the vehicle. In this way, the arms 20 of the several members serve as skids. As shown more particularly in Figs. 4 and 5, in loading the logs or other elements onto the vehicle, the cables 14 are drawn off from the pulleys 30 and looped around a group of the elements to be loaded, after which the free end of the cable is attached, usually to the up-standards 4 by the hooks 15. In placing the cables around the logs, it is preferred that they be so positioned that when they are taken up on the drums 13, the pull will be upon those portions of the cables passing from the vehicle under the logs, rather than upon the ends passing over the logs. When the cables are taken up by the operation of shaft 3 and drums 13, the logs will be drawn, as a group, into the space defined by the arms of the bifurcated members 16 and 17, the logs riding up, so to speak, the curved arms of the cradles or bifurcated members. It will be understood that the logs span the space between the cradles at each side of the vehicle and after the logs or other elements have been drawn as far into the cradles as is possible, continued taking-up of the cables will result in the cradles being rocked on their pivotal centers and elevated and ultimately drawn inwardly of the vehicle toward the standards 4. It will be observed that the several cradles are so arranged on their pivotal centers that the center of gravity of each cradle is located inwardly of the pivotal center 18 thereof or between said pivotal center and the longitudinal center of the vehicle. As a result, after the cradles have been swung inwardly to the position shown in Fig. 5, it is practically impossible for them to accidentally swing outwardly on their pivotal centers and, thus, displace the logs. By having the cables so arranged that the pull of the winch is on those portions of the cables passing beneath the logs, entry of the logs into the recesses, so to speak, of the bifurcated members is not apt to be interfered with as would be true if the pull were on that portion of the cable extending over the logs, as in this latter case there would be a tendency of the logs to pile up, so that some of them, the upper ones, might pass over the arms 21 of the bifurcated members or cradles. It should also be mentioned that the arms 21 serve to prevent the logs moving inwardly with respect to the bifurcated members or cradles after the latter are moved to their upright positions on the vehicle body. It will also be observed that the presence of the arms 21 renders it unnecessary to provide other means for swinging the cradles or bifurcated members. That is, as before described, after the logs have fully entered the cradles, continued pull on the cables tends to raise the logs and the latter cause the cradles to swing upwardly and inwardly. However, separate means can be provided for swinging the cradles, but with the present construction such additional means are unnecessary.

As previously described, the body of each cradle or bifurcated member is so located with respect to its pivotal center 18 that the center of gravity of the cradle will be located in a plane spaced inwardly of the vehicle body from the pivotal center of the cradle when the latter is in its upright position. However, to further insure stability of the load on the vehicle, chains 22 are provided, one end of each chain being attached to one of the standards 4 and the other being adapted to be secured to the upper end of arm 20 of the cradle. In addition, latches 32 are also provided and may be used either in place of or to supplement the chains 22. These latches may be of any desired form, but preferably consist of pins 33 passing through openings 34 in the standards 4 and of sufficient length to pass through openings 35 in the arms 21 of the cradles. Each pin may be provided with a suitable handle upon one end to facilitate insertion in, or withdrawal from, openings 34, 35, and with an aperture for reception of a cotter key or other similar means to prevent accidental displacement of the pin from the standard. Usually these pins are attached to the standards by a chain 38 to prevent loss thereof.

Figure 6:
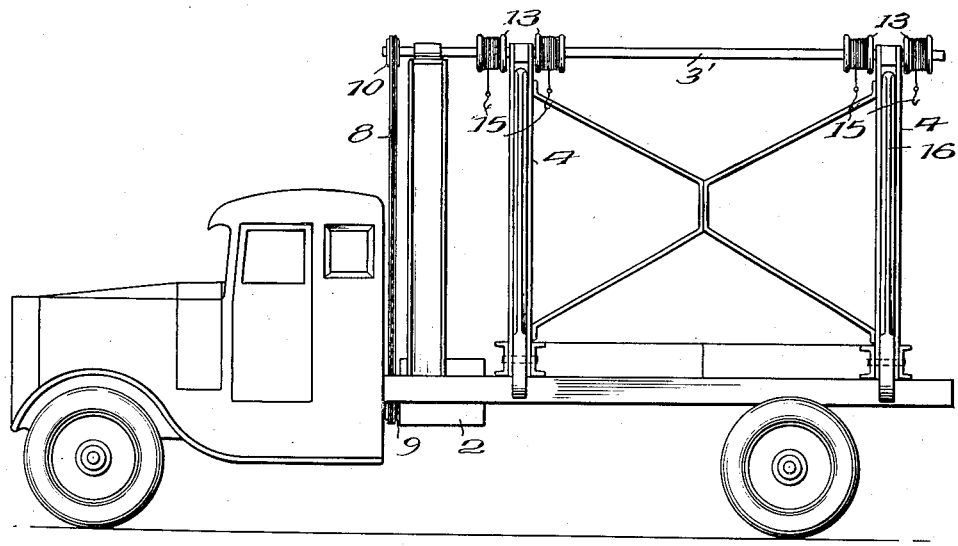
Fig. 6 is a side elevational view illustrating a modified form of the invention.

In the form of the invention illustrated in Fig. 6, the drums 13 are mounted on a shaft 3' journaled in the upper extremities of standards 4. This shaft is provided with a gear 10 adapted to be driven from gear 9 through a chain 8, gear 9 being driven by the winch 2. In this form of the invention, the cradles are adapted to be lowered, as in the preferred form of apparatus, and the cables 14 drawn off from the drums 13 and placed around a group of logs and the hooks 15 of the cable are then secured to the fixed part of the vehicle to permit the logs to be drawn into the cradles.

In the normal use of the present apparatus, logs are dragged from the woods where the trees have been felled to a roadside or to a plot of ground of sufficient size to accommodate the truck or other vehicle, but are left at a proper distance from what will be the loading position of the truck to provide clearance for the lowering of the cradles 16 and 17. Ordinarily, the logs will be assembled upon a rail or skidway, so as to provide space enough between them and the ground to facilitate passage of the cables under them. The truck having been brought to loading position, cradles 16 and 17 are swung on their pivotal centers 18 until the outer ends of arms 21 rest upon the ground. The cables are then withdrawn and passed around the desired number of logs and the ends of the cables hooked to the vehicle. To balance the load as much as possible and minimize the strain upon shaft 3 and supporting members 4, the cables from each pair of drums 13 and rollers 30 are used upon opposite sides of the truck. If desired, additional drums and cables may be provided. Obviously, in order to maintain proper balance of the truck while being loaded, approximately the same weight of logs should be picked up at each side. When the cables have been passed around the logs and the hooks fastened, winch 2 is actuated to wind or take in the cables thereby, first, drawing the logs into the cradles and, then, by continued winding, lifting the logs and the cradles into their upright position, after which the cradles may be secured either by chains 22 or latches 32, or both.

The lowering and unloading or dumping of the cradles is preferably accomplished as follows: The latch pins 32 are first withdrawn from the eyelets 35 in the arms 21 and the hooks 15 of the cables inserted in such openings or eyelets. Chains 22 are also released if they have been used. Winch 2 is then operated to further wind up the cables with the result that the inner arms 21 are lifted, so to speak, and cradles 16 and 17 caused to swing outwardly from the vehicle. This causes the center of gravity of the logs to move to a point beyond or outwardly from the pivotal centers 18 of the cradles, so that by reversing the operation of the winch 2, the cradles can be lowered to the ground, or rather, they are permitted to descend under influence of gravity, their movement being retarded by the cables 14, which are payed out at the desired rate of speed under the control of winch 2. If desired, additional rollers 31 may be provided on the standards 4 at a point somewhat below rollers 30, so that, in this leading operation, the cables can be brought from rollers 30 down around rollers 31 and then attached to the cradles in order to reduce the jerk or shock upon the cables which will ordinarily be caused by the sudden outward movement of cradles 16 and 17 as their centers of gravity pass their pivotal centers in the outward swinging of the cradles for unloading.

In its broader aspect, the invention contemplates the simultaneous loading of logs at opposite sides of the vehicle and, so far as this feature is concerned, the form of the cradles 16, 17, is more or less immaterial. While they are preferably constructed as shown, it is not necessary that they take the form of bifurcated members although it is preferred that a portion of said members, for instance, the arms 20, be so arranged as to constitute skids in order to aid in guiding the logs to the platform of the vehicle body. It will also be obvious that the cables may be attached to the cradles to raise or swing the latter from their lowered positions to their upright positions.

What I claim is:

1. In a loading apparatus for vehicles, the combination of substantially upright load embracing and retaining members pivoted at opposite sides of the vehicle body to swing in a vertical plane transversely thereof, the center of gravity of each member being located inwardly of the pivotal center of said member when the latter is in its upright load retaining position, and means for depositing the articles to be loaded on said members and simultaneously raising said members to their upright position.

2. In an apparatus for loading elongated elements on a vehicle, a pair of longitudinally spaced load retaining members pivoted at each side of the vehicle body to swing from a substantially upright position outwardly and downwardly from the vehicle body, and means for moving the elements to be loaded to a position on said members with said elements disposed longitudinally of the vehicle and supported by a pair of said members and for simultaneously raising said members to a substantially upright position.

3. In an apparatus for loading elongated elements on a vehicle, a pair of substantially upright members pivoted on the vehicle at each side thereof and swingable in a vertical plane outwardly and downwardly with respect to the body of the vehicle, said members being adapted to receive a plurality of said elongated elements, and means for raising said members to their upright position to support and retain the elements therein, the center of gravity of each of said members when the latter are in an upright load retaining position being located between the pivotal center of the member and the longitudinal center of the vehicle body.

4. In an apparatus for loading elongated elements on a vehicle body, standards at opposite ends of said body, bifurcated members pivoted on said body at opposite sides thereof, each member being capable of retaining a plurality of said elements between its arms or bifurcations, and each of said members being movable on its pivotal center outwardly and downwardly from the vehicle to its loading position with one arm thereof on the ground or other surface underlying the elements to be loaded, and means for raising said members from their loading position to a substantially upright position, the center of gravity of each member when in an upright position being located between the longitudinal center of the vehicle and the pivotal center of said member, and means for securing said members to said standards.

5. In an apparatus for loading elongated elements on a vehicle body, standards at opposite ends of said body, pulleys journaled on said standards, cables on said pulleys, rigid bifurcated members pivoted at each side of the body adjacent said standards, said members being movable from an upright position to a loading position with one arm or bifurcation of each member engaging the ground, and each member being adapted to receive a plurality of elements between its arms, means for fixedly securing one end of each cable to the vehicle, and means for reeling and unreeling the other end of each cable, whereby a group of elements embraced by loops formed in said cables can be drawn into the space between the arms of said bifurcations and said members raised to an upright position.

6. In an apparatus for loading elongated elements on a vehicle body, the combination of cables adapted to be payed out at opposite sides of the vehicle, means for forming a loop in each cable to embrace a multiplicity of said elements at opposite sides of the vehicle with the hauling end of the cable extending under said elements, drums on said vehicle, means for simultaneously winding said cables on the drums to move the looped portions of said cables toward the vehicle, and guide means attached to said body at opposite sides of the vehicle extending from the load-supporting surface of the vehicle to the ground surface.

7. In an apparatus for loading elongated elements on a vehicle body, the combination of cables adapted to be payed out at opposite sides of the vehicle, means for forming a loop in each cable to embrace a multiplicity of said elements at opposite sides of the vehicle with the hauling end of the cable extending under said elements, drums on said vehicle, means for simultaneously winding said cables on the drums to move the looped portions of said cables toward the vehicle, and guide means attached to said body at opposite sides of the vehicle extending from the load-supporting surface of the vehicle to the ground surface, said guide means being movable to upright positions at the sides of said body, and means for latching said guides in upright position.

8. In an apparatus for loading elongated elements on a vehicle body, the combination of cables adapted to be payed out at opposite sides of the vehicle, means for forming a loop in each cable to embrace a multiplicity of said elements at opposite sides of the vehicle with the hauling end of the cable extending under said elements, drums on said vehicle, means for simultaneously winding said cables on the drums to move the looped portions of said cables toward the vehicle, guide means pivoted on said body at opposite sides thereof adapted to extend from the load-supporting surface of the vehicle to the ground, said guides being movable to upright position by said cables, and means for latching the guides in upright position.

ROGER E. WHELESS.